United States Patent [19]

Acker

[11] Patent Number: 4,914,851
[45] Date of Patent: Apr. 10, 1990

[54] FISH LURE

[76] Inventor: Thomas W. Acker, 11870 62nd St. North, Largo, Fla. 33540

[21] Appl. No.: 776,709

[22] Filed: Sep. 16, 1985

Related U.S. Application Data

[63] Continuation-in-part of Ser. No. 605,055, Apr. 30, 1984, abandoned.

[51] Int. Cl.$^4$ .............................................. A01K 85/00
[52] U.S. Cl. .................................. 43/42.41; 43/42.05; 43/42.1
[58] Field of Search .................. 43/42.41, 42.4, 42.43, 43/42.42, 42.44, 42.1, 42.04, 42.05

[56] References Cited

U.S. PATENT DOCUMENTS

| | | | |
|---|---|---|---|
| 981,454 | 1/1911 | Miller | 43/42.1 |
| 1,454,820 | 5/1923 | Readle | 43/42.05 |
| 3,460,285 | 8/1969 | Perkins | 43/42.43 |
| 4,163,336 | 8/1979 | Carpenter | 43/42.44 |
| 4,163,337 | 8/1979 | Kress | 43/42.05 |
| 4,433,503 | 2/1984 | Schleif | 43/42.1 |
| 4,520,588 | 6/1985 | Hindermyer | 43/42.05 |

Primary Examiner—Kurt Rowan
Attorney, Agent, or Firm—Walter J. Monacelli

[57] ABSTRACT

A fish lure comprising a flexible body of conical shape having a passageway beginning at the apex thereof and terminating in a cavity at an enlarged open end of the body. The body is adapted to have assembled therein in the cavity a hook member, a sinker and a tail. The hook member includes one or more barb elements having outwardly radially and rearwardly extending portions, a shank and an eyelet preferably with sinker and tail mounted thereon. As an assembly, the hook member, sinker and tail are disposed within the cavity of the body with the eyelet arranged axially innermost of the cavity adjacent the passageway and has a fishing line extending through the passageway into attached relation thereto. The assembly forms a compact package with the body with only a streamer portion of the tail and the barb elements exposed axially outwardly of the body. The barb or plurality of barbs are arranged in close embraced relation on the enlarged end of body. By reason of this structure the lure is snagless and weedless and also can be readily and easily modified by axial removal of the assembly from the body. Furthermore as the fish grasps for the attracting streamer and body its mouth engages the enlarged end of the body, readily collapsing same and being hooked by the barb or barbs of the hook member.

7 Claims, 2 Drawing Sheets

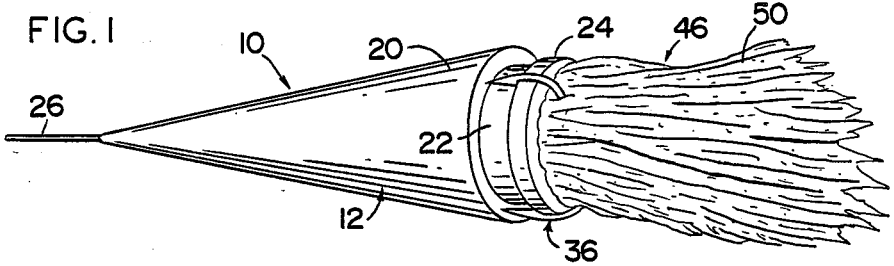
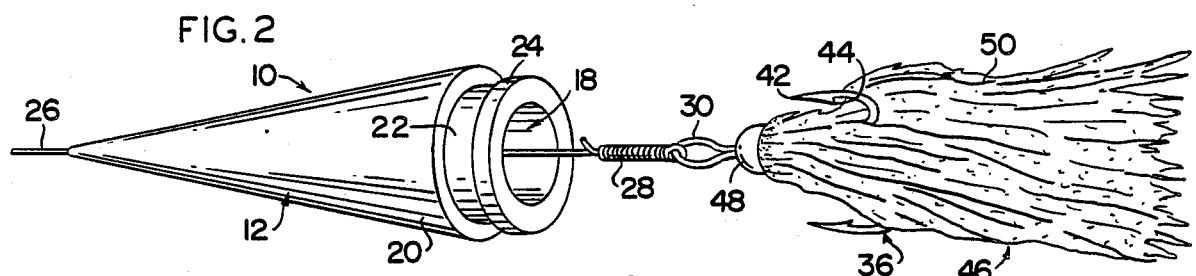
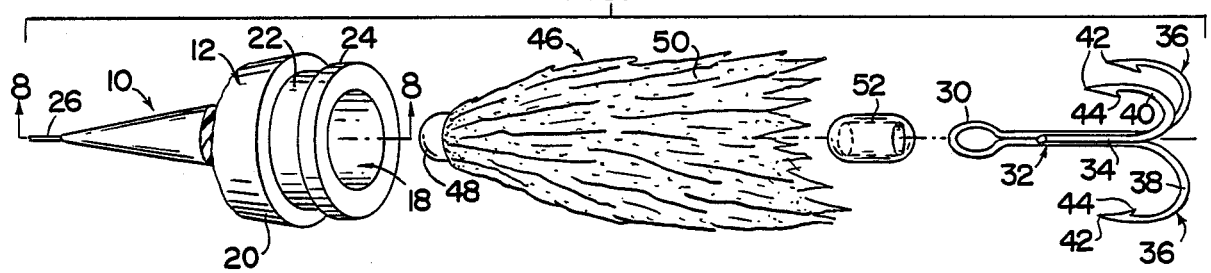
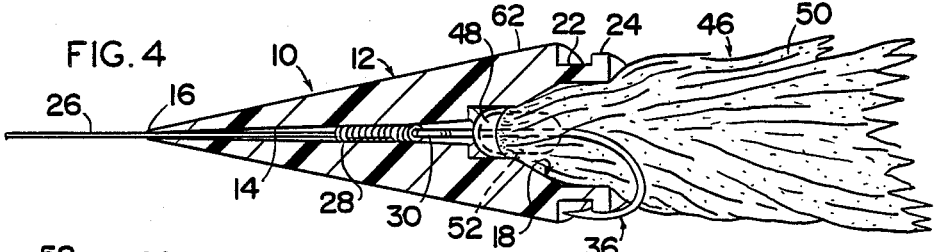
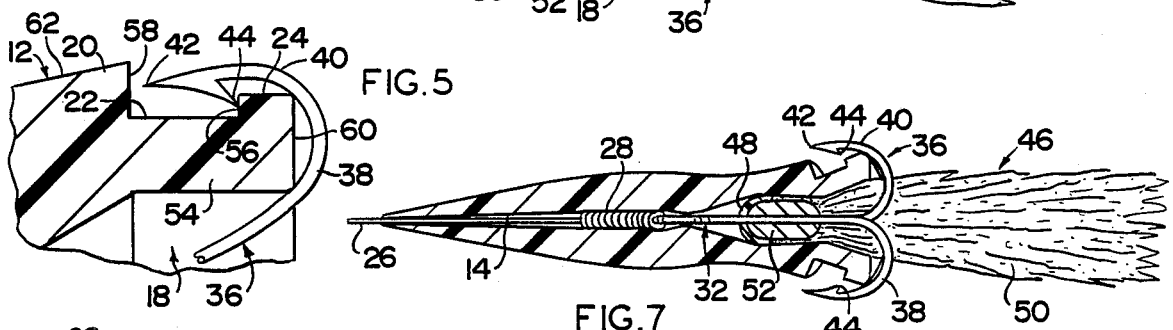
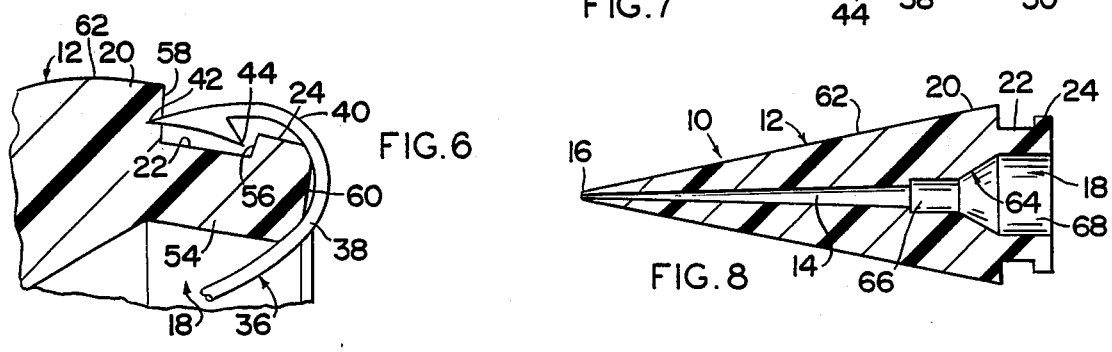

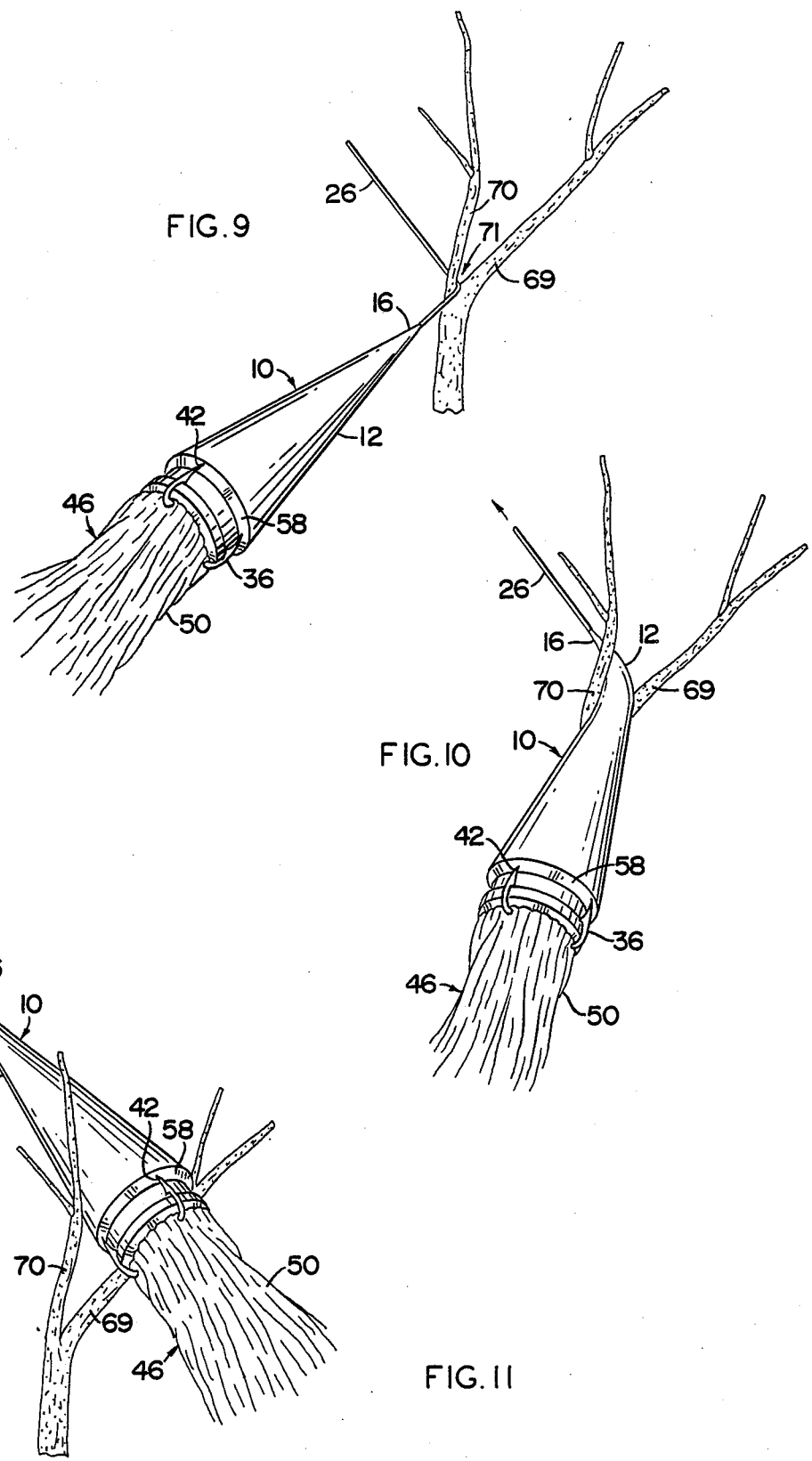

FISH LURE

This application is a continuation-in-part of copending application Ser. No. 605,055, filed Apr. 30, 1984, now abandoned.

BACKGROUND OF THE INVENTION

1. Field of the Invention

The fish lure covered by this invention is of the artificial type that is simple of construction and of the weedless, snagless variety without sacrificing lure action or hook effectiveness.

2. State of the Prior Art

The art of fish lures is extensive but nevertheless the present invention brings together in a compact, unique arrangement a lure including a weedless, snagless body, a fish attracting tail, a sinker and a hook which is not to be found in the prior art.

U.S. Pat. Nos. 1,948,983, 2,590,46, and 3,908,298 are believed to be representative of the art relative hereto. U.S. Pat. No. 1,948,983, while disclosing a somewhat similar body shape and hook arrangement to the invention herein lacks versatility of use and ease of adaptability to similar weight and tail modifications for variations in fishing conditions as provided by this invention. U.S. Pat. No. 2,590,461 is only comparable to the present invention in that it comprises a multiple barbed hook mounted upon a tapered flexible body. The similarity to the present invention ends there since the hook is fixedly secured in the body and thus is not adaptable to function the same both as to changeability and use in fishing. U.S. Pat. No. 3,908,298, while simple in construction lacks similarity of purpose or utility in that the hook-body arrangement is of a weedless, snag-free adapted only to provide a shield for a bait carrying hook.

SUMMARY OF THE INVENTION

The fish lure described herein includes a conically shaped body made of soft, flexible material such as a soft rubber or polyurethane having a passageway extending from an open end at the apex of the body into an enlarged cavity at the opposite end of the body. A fishing line is adapted to enter the passageway opening at the apex end of the body and extend therethrough for attachment to a fish attracting member. The apex end of the body is as thin or as narrow as possible so that the apex comes down to almost the thickness of the line passing through the apex opening. Preferably the thickness of the body around the apex opening is about 1/32 or 1/16 inch. The diameter of the opening at the apex is preferably approximately equal to or only slightly larger than the thickness of the line to be passed therethrough, preferably about 1/32 to 1/16 inch thickness. Moreover the soft flexible character of the body allows the apex and its adjacent portion to bend so as to follow the line around obstructions frequently encountered, such as brush or tree branches. The narrowness of the body at the apex and its ability to bend allows the lure to follow the line through or around obstructions and thereby avoids snagging. Moreover as the lure passes through a V-shaped obstruction, the thicker latter part of the conically shaped lure, by inclined plane action, causes the lure to be pushed further away from the narrower part of the V-shape.

The conical shape of the lure extends from the apex advantageously through at least 25 percent of the length of the lure and preferably through the entire length thereof. Where the lure is not completely conical, the remainder of the exterior of the lure may be cylindrical, bulbular, etc., and even fish-shaped.

Appropriately secured to the distal end of the line is a barbed hook with the line tied to the eye end of the hook. The hook includes a shank or stem upon which may be mounted a sinker weight and a fish attracting member in the form of a tail including multiplicity of narrow strips or streamers. With the tail, sinker and hook in assembled attachment to the fishing line they are as a unit received snugly within and upon the line body with the shank and eye of the hook, sinker and a portion of the streamers within the cavity of the lure body and the barbs of the hook extending radially outwardly and axially of the body. The body has a recess or groove on its outer surface at the cavity end thereof into which the axial portion of the barb is received. With the aforesaid combined structure of body and hook assembly a very compact lure is provided which is capable of avoiding snagging while effective to catch a fish that is attracted thereto. Once a fish is attracted to this lure and makes a grab for the streamer and body of the lure, this act collapses the wider, flexible end of the body and causes the fish to be ensnared by the barbs of the hook. The lure can be readily and easily modified as to sinker weight and location, hook variation, and streamer color, shape and length differences.

An object of the invention is to provide a simple, compact, weedless and snagless fish lure.

Another object of the invention is to provide a lure whose body increases in circumference from an apex end to a peripheral flange or skirt end, and having a fishing line passing freely through it for attachment to a hook, sinker and freely movable tail adapted to be securely held within the skirt end of the body.

A further object of the invention is the provision of a lure having a snagless and weedless body and an arrangement of hook, sinker and tail member adapted to be secured in the body but readily removable therefrom for modification, as to color, weight and shape or size.

BRIEF DESCRIPTION OF THE DRAWINGS

The description of the fish lure of this invention is better understood with reference to the following drawings wherein:

FIG. 1 is a side perspective view of a preferred modification of the fish lure illustrating the invention in full assembled form;

FIG. 2 is a side perspective view of the modification of FIG. 1 with the hook assembly and part of the fish line extending out of the lure body;

FIG. 3 is an exploded side perspective view of the lure shown in FIGS. 1 and 2.

FIG. 4 is a cross-section perspective view of the lure as shown in FIG. 1 taken mid-way through the structure for the full length thereof;

FIG. 5 is an enlarged partial cross-section view of the barb end of the hook normally arranged on the lure body;

FIG. 6 is an enlarged partial cross-section view of the barb end of the hook and its engagement with the lure body when the lure body engages an interfering body to fish line pull;

FIG. 7 is a cross-section view of the fish lure similar to FIG. 4 but as modified when grasped by the mouth of a fish;

FIG. 8 is a cross-section view taken along line 8φ8 of FIG. 3;

FIG. 9 is a side perspective view of the fish lure of FIG. 1 with the line leading through a V-shaped opening between two branches of a tree or bush;

FIG. 10 shows a view corresponding to that in FIG. 9 in which the line has advanced further so as to draw the lure part way through the V-shaped opening; and FIG. 11 shows a view corresponding to those in FIGS. 9 and 10 in which the lure has advanced still further through the V-shaped opening.

DETAILED DESCRIPTION OF THE PREFERRED EMBODIMENT

Reference is had to FIGS. 1 through 4 wherein a fish lure 10 comprises a flexible body 12 preferably made of rubber or the like. Body 12 is conical in form having a passageway 14 extending axially therethrough beginning at the apex end 16 of the body and terminating in a stepped bore or cavity 18 at the large end 20 of the body. An annular recess or groove 22 is provided on the outer surface of the body near the larger end thereof. At the extreme end of the large end of the body is an annular flange or lip 24 of reduced external diameter in relation to the outer surface of body on the opposite side of groove 22.

A fishing line 26 is adapted to extend through the passageway 14 with the distal end 28 thereof fixedly secured to an eyelet 30 of a hook member 32. The hook member includes a shank 34 and through barb elements 30 equally spaced angularly and arranged in axially spaced relation to the eyelet 30. The barb elements each include bowed section 38 and axially rearwardly extended sections 40 terminating in sharp points 42 and adjacent barbs 44.

A streamer or tail 46 forming a fish attracting member is preferably made of plastic and includes a collar 48 and a multiplicity of narrow strips 50 extending from the collar and flaring outwardly therefrom. The collar is adapted to slip over eyelet 30 onto shank 34 with the streamer arranged to extend axially beyond the barbed end of the hook with the barbs disposed radially outwardly of the streamer.

A sinker 52 of tubular shape is preferably of lead and is mounted on shank 34 axially between the streamer collar 48 and the barbs of the hook. For ease of assembly of the shank of the hook member, the sinker is split along its length so it can be slipped over the shank and pressed thereon. The sinker may be attached to or imbedded in the interior of the body 12 and thereby separable from the barb element or elements, which decreases the possibility of the fish shaking the barb elements loose after being hooked.

In the assembled arrangement of the fishing line 26, hook member 32, sinker 52 and streamer 46 as disclosed by FIG. 4, the hook member 32 has the barb elements received in the groove 22 so as to secure the assembly attached to the fishing line on the lure body during the normal use of the lure. While three hook members are preferred there may be as few as one and as many as four or more. The enlarged cross-section view of FIG. 5 clearly shows skirt end 54 of lure body 12, groove 22 and flange 24 with the bowed and barb end of the hook in normal assembly wherein barb 44 engages wall 56 of groove 22 with point 42 adjacent to or slightly spaced from wall 58 of groove 22. It is to be noted further that the inner side of bowed section 38 engages the annular end 60 corners of the lure body.

FIGS. 6 and 7 illustrate the condition that occurs when the outer inclined or tapered surface 62 of the body 12 encounters debris or other obstructions in the normal pull of line 26 and lure 10 through the water. As such, the hindrance to normal smooth movement of the lure causes the hook and assembly therewith to be drawn axially toward the apex of the body and the points 42 embed in wall 58 while the interference of the bowed sections 38 with annular end 60 of body 12 limits the penetration of points 42 in wall 58. Accordingly the points are restrained from setting or sticking thereto. As the tension which draws points 42 into wall 58 is released, points 42 will be withdrawn from the wall 58.

FIG. 8 clearly shows the interconnection of passageway 14 and cavity 18 interior of body 12 and wherein a conical tapered wall 64 is arranged intermediate openings 66 and 68 constituting portions of the cavity.

FIG. 9 shows line 26 extending through the apex opening 16 of the conical body 12 of lure 10 and at an angle between branches 69 and 70 through the V-shaped opening therebetween.

FIG. 10 shows line 26 further advanced through opening 71 (not shown directly) with the apex 16 following the angle of line 26 so that the flexible body 12 is bent at an angle as it passes between the two branches 69 and 70. As the body 12 is pulled through the V-shaped opening 71, the widening portion of body 12 forces itself farther up the sides of the V-shape.

FIG. 11 shows lure 10 and the conical body 12 further advanced through the V-shaped opening and the wider portion of the conical shape 12 moved further up the sides of the V-shaped opening until it becomes completely free and avoiding entanglement with branches 69 and 70.

Although the various elements of the lure have been specifically described, it is to be understood that various modifications thereof are within the scope of this invention. For instance, the body 12, while being depicted and defined as conical, could have a varying increasing diameter from one end to the other without being conical yet comparably effective for a like purpose. In the case of the hook member 36, more or less than the preferred three barb elements are possible. The tail 46 can be made of different types of material, various different colors or length. Likewise, the sinker can be of different sizes and weight or may be deleted, depending on fishing conditions.

OPERATIONAL USE OF THE LURE

With the lure appropriately connected to a fishing line and with normal casting and retrieval thereof, the lure is of such shape and construction that it is protected from snagging. In the direction of line pull the tapered shape and flexibility of the body allows the same to readily overcome debris encountered. As shown by FIGS. 9-11, the pointed, tapered shape and flexibility of the conical shape avoids entanglement that would be encountered and unavoided with blunter shapes having a more substantial width at the forward end where the line passes through. It has been found that the lure of this invention can follow the line through almost any opening that a fish lure will encounter.

The shape of the body and the compactness of the hook member-body assembly with tail 46 extending therefrom provides an effective attraction for fish such that as the fish grasps at tail 46 and the enlarged end of body 12 the fish mouth becomes hooked to the barb elements 36 of hook member 32. This is possible since as viewed in FIG. 7 the mouth of the fish closing upon body 12 readily collapses the body and skirt 54 thus exposing the barbs which in turn hook the fish.

During conditions that normally result in a snag, line pull is passed through the lure body resulting in drawing the hook member 32 axially of the lure body. As such, whereas the sinker 52 and tail 46 are free to slide along shank 34 simultaneously, end 20 under compression expands as shown in FIG. 5. Points 42 of the barb element or elements impinge upon wall 58 and become embedded therein. The penetration of the swelled end of body is limited by the engagement of inner side of bowed sections 38 of barbed elements upon the end 60 of body 12 and restraining setting of points 42 in the body 12. This reduces and in most cases avoids the possibility of snagging debris. With the relief of the snag conditions, line pressure on the hook member is diminished and the elastic memory of the lure body pushes the hook member and members assembled thereon rearward to normal rest position as seen in FIG. 1.

In the movement of lure 10 during a surface lure use in a retrieval direction the tapered shape 64 interior of the body produces a suction, popping noise effective to draw fish attention thereto.

When it is desired to modify the lure, particularly the hook member, sinker and tail mounted thereon, the same can be readily accomplished by merely collapsing the body and pulling hook member and assembly axially free of the body. As desired hook member replacement, variation in shape, size or color of tail, and casting weight of sinker can be made to best suit fishing conditions.

There are additional advantages of the lure. For example, in addition to the various advantages pointed out above particularly with regard to avoiding entanglement, the conical shape allows the lure to land always right side up after being cast. Moreover the conical body induces no torque or imbalance thereby greatly reducing line twist during retrieval. Also as pointed out above, the conical shape utilizes the principle of an inclined plane in pushing or maneuvering the lure over, under or around obstacles in it path.

The passage of the line through the lure allows the line to be attached directly to the hook element thereby eliminating a metal eye and knot at the front of the lure which reduces the possibility of moss or debris becoming attached to the front of the lure.

The soft material of the lure offers a more natural fleshy feel to the fish which might induce a harder, longer strike. Moreover the concave design at the rear of the lure body produces a suction to give a popping noise upon retrieval during a surface use of the lure.

Also as described above, the soft, flexible body of the lure holds the hook or hooks in protected position during casting and retrieving yet render the hook or hooks to exposure when the fish's mouth closes over and collapses the soft lure body.

The soft material and conical design with easy hook removal and replacement allows the lure components to be changed and interchanged to suit fishing conditions to accommodate color combinations, buoyancy, casting weight, etc.

Appreciating that the variations of structure are conceivably within the scope of the aforesaid description, the appended claims are intended to embrace the same.

The invention claimed is:

1. A fish lure comprising (1) an elastic flexible conical body, bendable along its linear axis, having a pointed apex and having a small diameter passageway extending from the apex of the body through a major portion of the length of the body and terminating in a cavity in the opposite end of the body thus providing a skirt, (2) a hook member including one or more barb elements, each of which includes radially outwardly and rearwardly extending portions terminating radially inward with barbs, and having a shank with an eyelet adjacent one end thereof opposite the barb element thereof, (3) a sinker mounted on either the interior of said conical body or on the shank of said hook member, and (4) a tail mounted on the hook member with the free ends thereof extending axially beyond the barb elements, the body having an annular groove in its outer surface adjacent the skirt end, and wherein the shank and eyelet of the hook member, the sinker and a portion of the tail are normally confined within the cavity of the body with the eyelet adjacent the junction of the passageway and cavity with the barbs received in the groove.

2. A fish lure according to claim 1 wherein a fishing line is adapted to extend through the passageway thus permitting the hook member, sinker and tail to be freely removable from the body together with the fishing line adapted to be attached to the eyelet.

3. A fish lure according to claim 2 wherein the barb elements additionally include rearwardly extending points adapted to be received in the groove in close axial spaced relation to an endwall thereof and wherein upon expansion of the body adjacent to the groove the points engage the wall from which they are normally spaced and further wherein upon expansion of the body the radially outwardly extending portion of the hook member engage the axial end of the skirt adjacent the open end of the cavity.

4. A fish lure according to claim 2, wherein the cavity includes a tapered wall with its small end near the passageway and its large end adjacent the skirt end of the body effective to produce a popping noise in the use of the lure.

5. A fish lure according to claim 1 in which the opening at the apex of said conical body has a diameter substantially equal to the diameter of the line to be passed therethrough and the wall of said apex around said opening has a thickness of approximately 1/32–1/16 inch.

6. A fish lure according to claim 1 in which the diameter of the opening at the said apex is in the range of 1/32 to 1/16 inch.

7. A fish lure according to claim 6 in which the wall of said apex around the opening therein has a thickness of 1/32 to 1/16 inch.

* * * * *